3,148,110
METHOD OF DISINFECTING WITH FORMALDEHYDE-COLLOIDAL SILICA AQUASOLS

Joe W. McGahen, Wilmington, Del., assignor to E. I. du Pont de Nemours and Company, Wilmington, Del., a corporation of Delaware
No Drawing. Filed Nov. 7, 1962, Ser. No. 236,771
5 Claims. (Cl. 167—26)

This invention relates to colloidal silica aquasols and to their protection from bacterial contamination.

According to the present invention, colloidal silica aquasols are protected from bacterial contamination by incorporation in the aquasol of formaldehyde in an amount sufficient to inhibit bacteria growth.

Even extremely small amounts of formaldehyde effect some corresponding benefits. Amounts as high as 5% by weight are effective bacteriacidally although above about 250 parts per million (p.p.m.) by weight are less desirable because of unpleasant odor. The exact amount will depend on the duration of aquasal storage, the bacteria level, temperature, and the like but in general amounts greater than 10 p.p.m. and ordinarily in the range from about 50 to 200 p.p.m. are preferred for economy and effectiveness. The amounts specified are based on the weight of the aquasol.

The aquasol can be added to the formaldehyde but it is most convenient to add the formaldehyde to the aquasol. Ordinary mixing and room temperature are adequate.

The formaldehyde can be used in any convenient concentration, in concentrated, or dilute aqueous form, to provide the desired amount of formaldehyde. The use of formaldehyde precursors such as paraformaldehyde, hexamethylenetetramine and the like is of course an equivalent of the use of formaldehyde itself and is fully intended to be embraced by this invention and the claims which appear below.

Inclusion of the formaldehyde in the colloidal silica aquasol inhibits the development of both gram positive and gram negative organisms including the Pseudomonas and Bacillus species. This reduces or eliminates the bacterial attack on the aquasol, with its attendant bacterial buildup and possible putrefaction, agglomeration, settling, smell, sliming, discoloration, and general product deterioration and degradation.

For some reason the colloidal silica in the aquasol appears not to fully adsorb the formaldehyde on the highly reactive surface of the silica and the formaldehyde is thus not deactivated and remains available to exert effective antibacterial action.

The cause of the problem itself is surprising. Colloidal silica aquasols are typically made and used at pH of about 8.5 to 10.0 and this alkalinity normally would not be expected to support bacteria growth and development.

Practice of the present invention is particularly useful during bulk storage of colloidal silica aquasols. Protection continues from preparation of the novel protected product, through storage, and into end use. The protective action is not destroyed by prolonged storage, even at elevated temperatures, as shown by retention of protected aquasol at 125° F. for a period of several months.

THE SILICA AQUASOLS

The silica aquasol employed in, and protected by, the present invention is a sol of substantially non-agglomerated particles, the freedom from agglomeration being sufficient that the relative viscosity as measured at 10% $SiO_2$ and pH 10 is in the range from 1.15 to 1.55.

The ultimate silica particles in the sol appear substantially as spheroids on an electron micrograph prepared by diluting the sol to about 0.1% $SiO_2$ and observing the particles at about 50,000 diameters magnification. Ideally, the particles are substantially all in the form of such spheroids. The spheroids are from 5 to 150 millimicrons in diameter and preferably the diameter is from 5 to 30 millimicrons.

The ultimate particles of silica are dense, in that their surface area as determined by nitrogen adsorption is not greater than about 25% different from the surface area as calculated from direct observation on the electron microscope. Alkali-stabilized sols are especially useful, such a sol being described for instance in Bechtold and Snyder U.S. Patent 2,574,902, Rule U.S. Patent 2,577,485 and Alexander U.S. Patent 2,750,345. All of these sols are characterized by being alkali-stabilized the $SiO_2:Na_2O$ weight ratio in a preferred class of sols being from 60:1 to 500:1.

The aquasol with its protective formaldehyde can of course be combined and ordinarily in use will be combined with a large number of other materials. The composition of the present invention is therefore described herein and claimed hereafter to permit the presence of other materials. Such materials include oils including animal, vegetable, synthetic and mineral oils, and emulsifiers such as lauroyl diethanolamide amide and diethyleneglycol laurate. These sol:oil:emulsifier compositions are useful for the treatment of textile fibers as described in Simko and Thompson U.S. Patent 2,910,374.

The protected aquasol can be used as will be understood in adhesives, paints, textile coatings, carpet treatments, floor waxes and coatings, and the like.

This invention will be better understood by reference to the following illustrative examples:

Example 1

Twenty gallons of colloidal silica aquasol containing about 30% silica solids and having a $SiO_2/Na_2O$ ratio of 96 ("Ludox" HS Colloidal Silica, E. I. du Pont de Nemours & Co.) and 100 p.p.m. of formaldehyde, added as a 10% solution prepared by dilution from 37% U.S.P. formaldehyde, are mixed with stirring. The resulting product is resistant to attack from both aerobic and anaerobic bacteria, as shown by periodic checks of bacteria buildup over an extended storage period, compared with a control sample lacking the formaldehyde.

Example 2

Example 1 is repeated except that the colloidal silica aquesol has a $SiO_2/Na_2O$ ratio of 285 ("Ludox" LS Colloidal Silica, E. I. du Pont de Nemours & Co.) with similarly satisfactory results.

Example 3

Three colloidal silica aquasol samples are prepared containing 0, 23 and 41 p.p.m. formaldehyde respectively. These are inoculated with bacteria isolated from a contaminated silica aquasol to give $1.5 \times 10^5$ bacteria per ml. After incubation at 30° C. for 48 hours the two samples containing formaldehyde have less than 10 bacteria per ml. while in the sample with no formaldehyde the bacteria has increased to $1 \times 10^7$ bact. per ml.

Example 4

A contaminated sample of colloidal silica aquasol containing $16.6 \times 10^3$ bacteria per ml. is divided into six portions. Formaldehyde is added to give a range of concentration of 0, 50, 100, 200, 400 and 600 p.p.m. After incubation at 30° C. for 90 minutes, one loopful from each sample is transferred to 9 ml. of thioglycollate broth, an excellent bacterial growth medium. These tubes are incubated for two weeks at 30° C. and checked for growth of bacteria. Only the tube inoculated from the colloidal silica with no added formaldehyde shows bacterial growth.

The invention claimed is:

1. The method of protecting from bacterial contamination a colloidal silica aquasol comprising admixing with said aquasol formaldehyde in an amount sufficient to inhibit growth of bacteria.

2. The method of protecting from bacterial contamination a colloidal silica aquasol in which the silica is present as substantially non-agglomerated particles from 5 to 150 millimicrons in diameter, said method comprising combining with said aquasol from 50 to 200 parts by weight of formaldehyde per million parts of said aquasol.

3. A composition stabilized against bacterial contamination comprising a colloidal silica aquasol and formaldehyde, the latter being present in an amount sufficient to inhibit growth of bacteria.

4. A composition comprising a colloidal silica aquasol and from 10 to 250 parts by weight of formaldehyde per million parts of aquasol.

5. A composition resistant to bacterial growth comprising a colloidal silica aquasol in which the silica is present as substantially non-agglomerated particles from 5 to 150 millimicrons in diameter and from 50 to 200 parts per million of formaldehyde, by weight based on the aquasol.

References Cited in the file of this patent
UNITED STATES PATENTS

| | | |
|---|---|---|
| 2,574,902 | Bechtold et al. | Nov. 13, 1951 |
| 2,577,485 | Rule | Dec. 4, 1951 |
| 2,750,345 | Alexander | June 12, 1956 |
| 3,016,328 | Pepper et al. | Jan. 9, 1962 |
| 3,028,340 | Gandon et al. | Apr. 3, 1962 |
| 3,046,234 | Roman et al. | July 24, 1962 |